(12) United States Patent
Keupp et al.

(10) Patent No.: US 12,502,078 B2
(45) Date of Patent: Dec. 23, 2025

(54) STAGED RECONSTRUCTION OF PLANNING IMAGES FOR CARDIAC MAGNETIC RESONANCE IMAGING

(71) Applicant: KONINKLIJKE PHILIPS N.V., Eindhoven (NL)

(72) Inventors: Jochen Keupp, Rosengarten (DE); Jan Jakob Meineke, Hamburg (DE); Christian Stehning, Hamburg (DE); Christophe Michael Jean Schuelke, Hamburg (DE); Mariya Invanova Doneva, Luneburg (DE); Peter Ulrich Börnert, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 291 days.

(21) Appl. No.: 18/282,243

(22) PCT Filed: Mar. 11, 2022

(86) PCT No.: PCT/EP2022/056401
§ 371 (c)(1),
(2) Date: Sep. 15, 2023

(87) PCT Pub. No.: WO2022/194715
PCT Pub. Date: Sep. 22, 2022

(65) Prior Publication Data
US 2024/0156346 A1 May 16, 2024

(30) Foreign Application Priority Data
Mar. 18, 2021 (EP) .................................... 21163453

(51) Int. Cl.
*A61B 5/00* (2006.01)
*A61B 5/055* (2006.01)
*G16H 30/00* (2018.01)

(52) U.S. Cl.
CPC ............ *A61B 5/0044* (2013.01); *A61B 5/055* (2013.01); *G16H 30/00* (2018.01)

(58) Field of Classification Search
CPC ....... A61B 5/0044; A61B 5/055; A61B 5/024; A61B 5/0816; A61B 5/7289; G16H 30/00;
(Continued)

(56) References Cited

U.S. PATENT DOCUMENTS

2017/0367612 A1* 12/2017 Kawrykow ...... G01R 33/56325
2018/0025466 A1* 1/2018 Mazurkewitz ........ G06T 11/008
382/131
(Continued)

FOREIGN PATENT DOCUMENTS

CN 112494030 A 3/2021
JP 20042833583 A 10/2004
(Continued)

OTHER PUBLICATIONS

Pace, Danielle et al "Creating 3D Heart Models of Children With Congenital Heart Disease Using Magnetic Resonance Imaging" Int. Soc. for Magnetic Reson. in Med. May 15, 2015.
(Continued)

*Primary Examiner* — Iriana Cruz

(57) ABSTRACT

Disclosed herein is a medical system (100, 300, 700) comprising a magnetic resonance imaging system (102) configured to acquire lines of k-space (144) data from a thoracic region (122) of a subject (118). Execution of machine executable instructions (140) causes a computational system (132) to: repeatedly (200) acquire the lines of k-space data by controlling the magnetic resonance imaging system with the pulse sequence commands; repeatedly (202) assemble motion resolved k-space data (146) from the lines of k-space data using at least one cardiac phase and one respiratory
(Continued)

phase of the subject as the k-space data is acquired; retrieve (204) at least a portion (148) of the motion resolved k-space data during acquisition of the k-space data; and construct (206) a preliminary three-dimensional cardiac image (150) using at least a portion of the motion resolved k-space data before acquisition of the lines of k-space data is finished. The pulse sequence commands are according to a three-dimensional free running cardiac magnetic resonance imaging protocol.

15 Claims, 8 Drawing Sheets

(58) Field of Classification Search
CPC .............. G01R 33/543; G01R 33/4822; G01R 33/4826; G01R 33/561; G01R 33/567; G01R 33/5608; G01R 33/56325
See application file for complete search history.

(56) References Cited

U.S. PATENT DOCUMENTS

| | | | | |
|---|---|---|---|---|
| 2018/0140216 | A1* | 5/2018 | Li | ........................... A61B 5/02 |
| 2021/0311152 | A1* | 10/2021 | Hu | ................... G01R 33/56509 |
| 2022/0108540 | A1* | 4/2022 | Lamash | ................... G06T 19/20 |

FOREIGN PATENT DOCUMENTS

| | | |
|---|---|---|
| JP | 2010246777 A1 | 11/2010 |
| WO | 2017223187 A1 | 12/2017 |

OTHER PUBLICATIONS

Gueddari Loubna et al "Online MR Image Reconstruction for Compressed Sensing Acquisition in T2 Imaging" Wavelets and Sparsity XVIII, Sep. 9, 2019.

International Search Report and Written Opinion From PCT/EP2022/056401 Mailed Jun. 21, 2022.

Kustner et al "Fully Self-Gated Free-Running 3D Cartesian Cardiac CINE with Isotropic Whole-Heart Coverage in less than 2 Min" NMR in Biomedicine, 2021 p. 1-13.

Muthurangu et al "Single Breath Hold 3D Cine Imaging of the Heart.." Proc. Intl. Soc. Mag. Reson. Med. 14 (2006) p. 1636.

Noble et al "32-Channel Non-Angulated Cine Cardiac Volumes—Automatic Reformatting" Proc. Intl. Soc. Mag. Reson. Med. 14 (2006) p. 791.

Uribe et al "Whole-Heart Cine MRI Using Real-Time Respiratory Self-Gating" Magnetic Reson. in Med. vol. 57, p. 606-613 (2007).

* cited by examiner

STAGED RECONSTRUCTION OF PLANNING IMAGES FOR CARDIAC MAGNETIC RESONANCE IMAGING

CROSS REFERENCE TO RELATED APPLICATIONS

This application is a U.S. national phase application of International Application No. PCT/EP2022/056401 filed on Mar. 11, 2022, which claims the benefit of EP Application Serial No. 21163453.0 filed on Mar. 18, 2021 and is incorporated herein by reference.

FIELD OF THE INVENTION

The invention relates to magnetic resonance imaging, in particular to cardiac magnetic resonance imaging.

BACKGROUND OF THE INVENTION

Various tomographic medical imaging techniques such as Magnetic Resonance Imaging (MRI), Computed Tomography, Positron Emission Tomography, and Single Photon Emission Tomography enable detailed visualization of anatomical structure of a subject. A common feature of all of these imaging modalities is that it takes a significant amount of time to acquire the medical imaging data necessary to reconstruct a medical image. During the acquisition of the medical imaging data the subject may move voluntarily or involuntarily resulting in image corruption or artifacts. This is particularly true for cardiac imaging where the subject's heart is beating. The subject may also breath during the cardiac imaging also.

The journal article Küstner, Thomas, et al. "Fully self-gated free-running 3D Cartesian cardiac CINE with isotropic whole-heart coverage in less than 2 min." NMR in Biomedicine 34.1 (2021): e4409 discloses a free-breathing 3D Cartesian cardiac CINE scan with a water-selective balanced steady-state free precession and a continuous (non-ECG-gated) variable-density Cartesian sampling with spiral profile ordering, out-inward sampling and acquisition-adaptive alternating tiny golden and golden angle increment between spiral arms is described. Data is retrospectively binned based on respiratory and cardiac self-navigation signals. A translational respiratory-motion-corrected and cardiac-motion-resolved image is reconstructed with a multi-bin patch-based low-rank reconstruction (MB-PROST) within about 15 min. A respiratory-motion-resolved approach is also investigated. The proposed 3D Cartesian cardiac CINE is acquired in sagittal orientation in 1 min 50 s for 1.9 mm3 isotropic WH coverage. Left ventricular (LV) function parameters and image quality derived from a blinded reading of the proposed 3D CINE framework are compared against conventional multi-slice 2D CINE imaging in 10 healthy subjects and 10 patients with suspected cardiovascular disease.

SUMMARY OF THE INVENTION

The invention provides for a medical system, a computer program, and a method in the independent claims. Embodiments are given in the dependent claims.

There are several impediments to performing cardiac magnetic resonance imaging. One major impediment is that the operators of the magnetic resonance imaging system require detailed training to properly perform the cardiac imaging. Another difficulty is that it can be very time consuming to execute a cardiac imaging protocol. The operator would first put the subject into the magnetic resonance imaging system, perform planning scans, precisely position further regions of interest, and then start to perform the diagnostic imaging.

Embodiments may provide a way to reduce the training burden on operators as well as possibly provide a means to reduce the overall time of the procedure. To achieve this the subject is placed into the magnetic resonance imaging system and begins to repeatedly acquire (in some instances continuously) lines of k-space data. During the acquisition of the lines of k-space data they are assembled into motion resolved k-space data. A portion of the of motion resolved k-space data is retrieved while acquisition of further lines of k-space data is still occurring. This portion of the motion resolved k-space data is used to assemble a preliminary three-dimensional cardiac image (likely using a compressed sensing reconstruction algorithm) before acquisition of the lines of k-space data is finished. This may have the advantage of providing the operator with an image which can be used for further planning while acquisition of the lines of k-space data is still occurring. This may greatly accelerate the entire workflow.

In one aspect the invention provides for a medical system that comprises a magnetic resonance imaging system that is configured to acquire k-space data from a thoracic region of a subject. The thoracic region may be considered to be a part of the chest of the subject that contains the subject's heart. The medical system further comprises a memory that stores machine-executable instructions and pulse sequence commands. The pulse sequence commands are either commands or data which may be converted into such commands that are used for controlling a magnetic resonance imaging system according to a magnetic resonance imaging protocol. For example, the pulse sequence commands could be a timing diagram that controls the different components of the magnetic resonance imaging system.

The pulse sequence commands are configured to repeatedly acquire lines of k-space data according to a three-dimensional free-running cardiac magnetic resonance imaging protocol. In some examples the same lines of k-space data are acquired repeatedly. In other examples the lines of k-space data are modified to reduce the chance that they are acquired for the same location. For example, the k-space data that is acquired may be lines or spokes of k-space data that are rotated. A three-dimensional free-running cardiac magnetic resonance imaging protocol as used herein encompasses a magnetic resonance imaging protocol that is three-dimensional. It also encompasses a magnetic resonance imaging protocol that is configured for imaging the heart or a cardiac region. It is noted here that the thoracic region of the subject contains the subject's heart. The term 'free-running' in free-running cardiac magnetic resonance imaging protocol indicates that the acquisition of the k-space data is continual or done on a repeated basis.

The pulse sequence commands are configured to repeatedly acquiring the lines of k-space data for a predetermined region of interest. The medical system further comprises a computational system. A computational system is intended to represent one or more processing or computing cores that may be located at one or more locations. Execution of the machine-executable instructions causes the computational system to repeatedly acquire the lines of k-space data by controlling the magnetic resonance imaging system with the pulse sequence commands. As this is a free-running cardiac magnetic resonance imaging protocol the free-running nature of this is expressed in the repeated acquisition of the k-space data. Execution of the machine-executable instructions further causes the computational system to repeatedly assemble motion-resolved k-space data from the lines of k-space data using at least one cardiac phase and one respiratory phase of the subject as the k-space data is acquired.

The assembly of the motion-resolved k-space data could be performed in a variety of ways. In one example, the motion-resolved k-space data is assembled by binning or sorting the k-space data. For example, the self-navigation within the k-space data could be one way of sorting it. Another way would be to have an external sensor such as a breathing, VCG monitor, or ECG monitor. Another interpretation of assembling the motion-resolved k-space data is so-called soft gating wherefore a particular motion phase k-space data is given a weighting factor and it contributes to this particular phase.

The motion-resolved k-space data is assembled repeatedly. This means that it is assembled at least twice. The lines of the k-space data using the at least one cardiac phase and the one respiratory phase could be taken once sufficient k-space data for a particular motion phase is acquired.

Another possibility is that after a line or a few lines of k-space data have been acquired, the motion-resolved k-space data is further assembled using this further acquired k-space data so that as the acquisition of the k-space data for the free-running cardiac magnetic resonance imaging protocol progresses the k-space data using the at least one cardiac phase and one respiratory phase becomes more completely sampled.

The motion-resolved k-space data is also assembled after the k-space data has been completely acquired, that is to say after all repetitions of the acquisition of the lines of k-space data have been acquired. This is then used in some embodiments to produce a cine image sequence.

In another embodiment the portion of the motion resolved k-space data is undersampled.

In another embodiment the preliminary three-dimensional cardiac image is reconstructed using the at least a portion of the motion resolved k-space data using a compressed sensing (CS) reconstruction algorithm.

In another embodiment execution of the machine-executable instructions further causes the computational system to retrieve at least a portion of the motion-resolved k-space data during acquisition of the k-space data. In other words, as the pulse sequence commands are being executed and the lines of k-space data are being continually acquired, the portion of the motion-resolved k-space data is then retrieved. Then, execution of the machine-executable instructions further causes the computational system to construct a preliminary three-dimensional cardiac image using at least a portion of the motion-resolved k-space data before acquisition of the k-space data is finished. That is to say while the system is still acquiring lines of k-space data the computational system constructs the preliminary three-dimensional cardiac image. This may be beneficial because a major source of delay in cine or cardiac three-dimensional imaging is that it takes time to reconstruct images and perform alignments.

This embodiment may have the benefit that it accelerates the process of performing further magnetic resonance imaging protocols because before the acquisition of the lines of k-space data are finished there is already the preliminary three-dimensional cardiac image. This can be used for such things as planning further magnetic resonance imaging protocols or providing preliminary data which enables a physician or other operator to make decisions about further parts of the examination of the subject.

Motion-resolved k-space data is data that contains or is referenced to motion data. For example, as was mentioned above, there may be k-space data that is separated into different bins and a label or meta data for the bin indicates a particular cardiac and/or respiratory phase. Likewise, the individual parts of the k-space data could have data which provides a weighting for different cardiac and/or respiratory phases. This is referred to as so-called soft gating. When a particular phase is reconstructed the k-space data is taken and the weighting is applied to see how much this k-space data contributes to that particular motion phase or state.

The preliminary three-dimensional cardiac image could for example be from a single motion phase such as a cardiac or respiratory phase or it can be constructed using the k-space data of a range of several adjacent motion phases. For example, the preliminary three-dimensional cardiac image is constructed before all of the k-space data has been acquired. In this case it may be beneficial to construct an image from several phases such as neighboring phases to enable a better fitting, for example, to a deformable model.

It should be noted that the cardiac phase could for example be determined using different means. An ECG system, a VCG system, or a camera-based patient monitoring system that measures the motion of the thorax of the subject, or by using a self-navigation in the k-space are all examples that are effective. The pulse sequence commands could for example be for a Cartesian sampling pattern in k-space. In some examples the same locations in k-space may be acquired repeatedly. If there is a large enough number of phases, such as large number of respiratory and cardiac phases, it is unlikely that the k-space data will be resampled too many times.

Another option is that there may be pulse sequence commands that sample the k-space data using a radial four or larger dimensional acquisition with isotropic voxel size. This embodiment may be beneficial because a blade or line of k-space data may be rotated in three-dimensional space or two-dimensionally. This means that if data is acquired for the same motion state or phase it contributes to providing a better sample of the k-space instead of resampling the same location again. In both Cartesian and in the radial four-dimensional acquisition case, they may also additionally be done using compressed sensing. This may be particularly beneficial because it may provide for a way of greatly accelerating the acquisition of the complete k-space data.

For a radial acquisition with more than four-dimensions the additional dimensions could include various contrasts, diffusion weightings, and etc.

In another embodiment the memory further comprises a deformable cardiac model. A deformable cardiac model as used herein encompasses a cardiac model which has curves or surfaces defined in it which have an elasticity built into them. This keeps the surfaces of the model smooth as they are deformed. Typically, anatomical landmarks identified in an image will be fit to anatomical landmarks of the deformable cardiac model. The deformable cardiac model is three-dimensional. And the deformable cardiac model further defines a set of planes. As the deformable cardiac model is deformed, the location of the planes changes also. The planes may for example be defined by particular points or anatomical landmarks contained in the deformable cardiac model. So as the deformable cardiac model is adjusted to fit, for example, the preliminary three-dimensional cardiac image, the set of planes is automatically positioned also.

Execution of the machine-executable instructions further causes the computational system to construct a fitted cardiac model by fitting the deformable cardiac model to the preliminary three-dimensional cardiac image. Fitting the deformable cardiac model to the preliminary three-dimensional cardiac model adjusts the location of the set of planes in the fitted cardiac model. The set of planes comprises at least one cardiac viewing plane. Execution of the machine-executable instructions further causes the computational system to provide the at least one cardiac viewing plane. This may for example be to simply provide the location of the cardiac viewing plane or it may be to render a view of the preliminary three-dimensional cardiac image from that particular cardiac viewing plane. This embodiment may be beneficial because it provides a viewing plane automatically which can be used to view the preliminary three-dimensional cardiac image or other images which are subsequently reconstructed from the repeated lines of k-space data that have been assembled into the motion-resolved k-space data.

In another embodiment the three-dimensional free-running cardiac magnetic resonance imaging protocol is a functional cardiac imaging protocol configured for reconstructing a cine image sequence. The medical system further comprises a user interface. Execution of the machine-executable instructions further causes the computational system to reconstruct the cine image sequence from the motion-resolved k-space data after the acquisition of the k-space data is completed. The k-space data was repeatedly acquired and then assembled into the motion-resolved k-space data. This would be the final assembly of the motion-resolved k-space data that is used to reconstruct the cine image sequence. Fitting of the deformable cardiac model to the preliminary three-dimensional cardiac image begins before or concurrently with the reconstruction of the cine image sequence. This may be beneficial because it decreases the amount of time for the entire protocol or use of the medical system.

Execution of the machine-executable instructions further causes the computational system to render at least a portion of the cine image sequence from the at least one cardiac viewing plane. This embodiment is beneficial for several reasons. Firstly, the at least one cardiac viewing plane was provided automatically, the operator did not do this manually. An additional and larger benefit is that this was performed before or concurrently with the reconstruction of the cine image sequence. This means that the delay before the operator can view the cine image sequence is reduced. This leads to a more effective and cost-effective use of the medical system.

In another embodiment execution of the machine-executable instructions further causes the computational system to detect a cardiac anomaly using the cine image sequence and/or the fitted cardiac model. For example, various criteria or measurements can be made on the cine image sequence and/or the fitted cardiac model and particular cardiac problems or anomalies can be detected using these measurements. Execution of the machine-executable instructions further cause the computational system to receive a recommended image flow workflow by creating a workflow database with the cardiac anomaly.

The workflow database comprises multiple magnetic resonance imaging workflows each referencing at least one cardiac anomaly identifier. The workflow database is configured to return the recommended imaging workflow by matching the cardiac anomaly to the cardiac anomaly identifier of the recommended imaging workflow. For example, the medical system can be configured to perform various measurements on the cine image sequence and/or the fitted cardiac model and if these measurements are outside of a predetermined range it can identify a specific or potential cardiac anomaly. This can then be used to query or retrieve the recommended imaging workflow from the workflow database. Execution of the machine-executable instructions further causes the computational system to display the recommended imaging workflow on the user interface.

This embodiment is beneficial because the operator does not manually retrieve a particular imaging workflow. The identified cardiac anomaly is used to query the database and these instructions are provided to the operator automatically. In some examples the operator could have the option of ignoring or retrieving other workflows. In other embodiments the recommended imaging workflow may comprise instructions or even pulse sequence commands used to automatically configure the magnetic resonance imaging system for additional measurements.

In another embodiment the recommended imaging workflow comprises further pulse sequence commands. Execution of the machine-executable instructions further causes the computational system to configure a geometrical orientation of further pulse sequence commands using the set of planes from the fitted cardiac model. As was mentioned before, the deformable cardiac model can have planes which are defined by particular points in the model. As the model is deformed this also changes the location of the planes. Certain planes which are used to configure magnetic resonance imaging acquisition for example, can then therefore be automatically positioned. This has the benefit that the operator does not need the skill to position these planes manually. Additionally, even if the operator does know how to position the planes, they will have been done automatically and the operator may have for example, the option of simply proceeding or making small manual adjustments to the positions of the plane. In either case, this greatly accelerates the use of the medical system.

In another embodiment detecting a cardiac anomaly using the cine image sequence and/or the fitted cardiac model comprises reconstructing a static three-dimensional cardiac image from at least a portion of the cine image sequence. The detection of the cardiac anomaly further comprises identifying the cardiac anomaly as a thickened right ventricle in the static three-dimensional cardiac image using a right ventricle wall thickness measuring algorithm. For example, an automated algorithm can be used or configured such that it measures the thickness of the right ventricle. If the thickness of the right ventricle is above a predetermined thickness threshold then this can be identified as a potential cardiac anomaly.

Detecting a cardiac anomaly using the cine image sequence and/or the fitted cardiac model further comprises identifying the cardiac anomaly as a thickened left ventricle in the static three-dimensional cardiac image using a left ventricle wall thickness measuring algorithm. In both of these cases the recommended imaging workflow is a quantitative flow analysis and/or a cardiac motion pattern analysis if the cardiac anomaly is a thickened right ventricle or a thickened left ventricle.

The left or right ventricle wall thickness measuring algorithm may be, for example, a machine learning algorithm or a segmentation algorithm. The quantitative flow analysis may comprise quantification of the ejection fraction, the stroke volume, the end-diastolic volume, the end-systolic volume and/or other quantitative measures of heart function. Quantification of these measures is advantageous, because they can be used to guide clinical decision making.

In another embodiment the cardiac anomaly using the cine image sequence and/or the fitted cardiac model comprises identifying the cardiac anomaly as an abnormal heart wall motion by inputting the cine image sequence into an abnormal heart wall thickness motion detection algorithm. For example, the cine image can be put into this algorithm and it can monitor the location of the heart wall. If it is outside a predetermined range of movement, then it can be triggered that this is a potential cardiac anomaly. In this case the recommended imaging workflow comprises a late gadolinium enhancement magnetic resonance imaging protocol to detect cardiac scar tissue.

In another embodiment the recommended imaging workflow comprises a cardiac stress test and/or a magnetic resonance perfusion test if the abnormal heart wall motion is not detected. Where a contrast injection is recommended the workflow may be carefully adjusted to allow the quick assessment of the first-pass perfusion, possibly also including stress medication and also to include sufficient time, 10-15 minutes until the late gadolinium enhancement contrast is established.

In another embodiment detecting a cardiac anomaly using the cine image sequence and/or the fitted cardiac model comprises identifying the cardiac anomaly as a potential myocarditis if a cardiac anomaly is not detected. The recommended imaging workflow comprises a T2-weighted imaging protocol to identify cardiac information and/or a late gadolinium enhancement magnetic resonance imaging protocol to identify diffuse fibrosis. In these and also the other recommended imaging workflows the positioning of the regions of interest for these may be done automatically using the set of planes.

The recommended imaging workflow may possibly comprise a T2-weighted imaging protocol to identify cardiac inflammation and/or a late gadolinium enhancement magnetic resonance imaging protocol to identify diffuse fibrosis. Late gadolinium enhancement is a technique used in cardiac magnetic resonance imaging for cardiac tissue characterization, in particular the assessment of regional scar formation and myocardial fibrosis.

In another embodiment, the preliminary three-dimensional cardiac image is motion resolved. For example, the portion of the motion resolved k-space data could be retrieved from multiple cardiac phases and multiple respiratory phases in order to provide a respiratory motion resolved preliminary three-dimensional cardiac image. For each combination of cardiac and respiratory phase a sub image could be reconstructed from preliminary data that represents that combination of cardiac and respiratory phase. If the motion resolved k-space data is assembled by binning the different cardiac and respiratory phases, then a sub image is reconstructed for each bin. The deformable cardiac model may be fitted to the sub images from each bin with the result that the deformable cardiac model and the fitted cardiac model are motion resolved. This embodiment may be advantageous because the at least one cardiac viewing plane, which is defined in the models is then also known as a function of the respiratory phase. This may be useful for further accelerating the magnetic resonance imaging examination.

In another embodiment, execution of the machine executable instructions further causes the computational system to determine a set of field deformations between different cardiac phases and respiratory phases of the fitted cardiac model. This could for example be performed by noting deformations between the model for the different cardiac and respiratory phases.

Execution of the machine executable instructions further causes the computational system to reconstruct a static magnetic resonance image from the motion resolved k-space data according to a motion-compensating magnetic resonance imaging reconstruction that uses the set of field deformations between the different respiratory phases to perform motion correction. For example, the deformation field can be included in a transformation matrix during an iterative reconstruction before data consistency operations. This embodiment may be beneficial because the motion correction does not require additional reconstruction time after acquisition of the lines of k-space data is completed.

An exemplary method of performing the motion correction may be based on the preliminary image deformation vector fields between different resp motion states are estimated. These are then included in the reconstruction by minimizing the functional $\|E\ T\_r\ x - y\_r\|\_2^2$ where $T\_r$ is the deformation that warps the 4d images times (3d+cardiac phase) from a reference resp state, e.g. exhale, to respiratory state r. E is the usual encoding operator describing the measurement and $y\_r$ is the acquired part of k-space for state r. In the proceeding, the "^" operator means the character or variable following it is a superscript and the "_" operator means the following character or variable is subscript.

In another embodiment execution of the machine-executable instructions further cause the k-space data to be additionally motion-resolved by a respiratory phase of the subject. This is beneficial because then the cine data could be, for example, resolved according to both the cardiac and respiratory phase.

The medical system in another embodiment may comprise a respiratory phase measurement system. This for example could be a respiratory belt attached to the chest of the subject. In another example it could be a measurement device on a breathing tube of the subject. In another embodiment this could be performed using a camera or imaging system to measure chest motion of the subject. For example, the respiratory phase might be acquired using pneumotachograph or a spirometer. In another embodiment at least a portion of the motion-resolved k-space data is retrieved a single time during acquisition of the k-space data either after a predetermined acquisition duration or after a predetermined number of k-space data acquisitions. In this embodiment the k-space data used to reconstruct the preliminary three-dimensional cardiac image is retrieved only once.

In another embodiment the at least a portion of the motion-resolved k-space data is retrieved repeatedly during acquisition of the k-space data. The preliminary three-dimensional cardiac image is reconstructed in iterative steps from the motion-resolved k-space data. For example, if the motion-resolved k-space data is undersampled, a compressed sensing algorithm may be used for reconstructing the preliminary three-dimensional cardiac image. The compressed sensing reconstructions use an iterative reconstruction of the image. An advantage of continually updating the k-space data is that as the algorithm progresses the k-space data comprises more and more information and is less undersampled. This may lead to a reconstruction of a better quality preliminary three-dimensional cardiac image.

In another embodiment the predetermined region of interest has a volume greater than 750 cm3. In this embodiment the predetermined region of interest has a relatively large volume in comparison to the volume of the heart. This has the benefit that, for example, the subject could be aligned using an alignment device such as a projected light image or a laser to identify the rough location of a subject's heart and then the subject can be moved into the magnet and the procedure can start without the use of a scout image. This may reduce the burden on the operator in terms of training to perform the cardiac imaging.

In another embodiment the machine-executable instructions are configured to disable adjustment of the predetermined region of interest. In this embodiment the predetermined region of interest is actually set and fixed for this particular magnetic resonance imaging protocol or procedure. This is then set up so that it operates in more of an automatic mode. In this example the operator may also align the rough position of the subject's heart ahead of time and then move them into the magnet and have the procedure start.

In another aspect the invention provides for a computer program comprising machine-executable instructions for execution by a computational system controlling a magnetic resonance imaging system configured to acquire k-space data from a thoracic region of a subject. Execution of the machine-executable instructions causes the computational system to repeatedly acquire the lines of k-space data by controlling the magnetic resonance imaging system with the pulse sequence commands. The pulse sequence commands are configured to repeatedly acquire lines of k-space data according to a three-dimensional free-running cardiac magnetic resonance imaging protocol. The pulse sequence commands are configured to repeatedly acquire the lines of k-space data for a predetermined region of interest. For example, the predetermined region of interest may be fixed. The predetermined region of interest may have a volume that is larger than the volume of a heart or a typical heart of a subject.

Execution of the machine-executable instructions further causes the computational system to repeatedly assemble motion-resolved k-space data from the lines of k-space data using at least one cardiac phase and one respiratory phase of the subject as the k-space data is acquired. Execution of the machine-executable instructions further causes the computational system to retrieve at least a portion of the motion-resolved k-space data during acquisition of the k-space data. Execution of the machine-executable instructions further causes the computational system to construct a preliminary three-dimensional cardiac image using the at least a portion of the motion-resolved k-space data before acquisition of the k-space data is finished.

In another aspect the invention provides for a method of operating the magnetic resonance imaging system. The magnetic resonance imaging system is configured to acquire k-space data from a thoracic region of a subject. The method comprises repeatedly acquiring the lines of k-space data by controlling the magnetic resonance imaging system with the pulse sequence commands. The pulse sequence commands are configured to repeatedly acquire lines of k-space data according to a three-dimensional free-running cardiac magnetic resonance imaging protocol. The pulse sequence commands are configured to repeatedly acquire the lines of k-space data for a predetermined region of interest.

The method further comprises repeatedly assembling the motion-resolved k-space data from the lines of k-space data using at least one cardiac phase and one respiratory phase of the subject as the k-space data is acquired. The method further comprises retrieving at least a portion of the motion-resolved k-space data during acquisition of the k-space data. The method further comprises constructing a preliminary three-dimensional cardiac image using at least a portion of the motion-resolved k-space data before acquisition of the k-space data is finished.

In another embodiment the method further comprises placing the thoracic region of the subject within the predetermined region of interest. There may be different ways of achieving this. For example, there may be reference marks on a subject support and the approximate location of the heart could be noted relative to these marks. The operator could for example move a light-pointing device over the subject to mark where the heart is and then this heart region could then be moved into the predetermined region of interest. In other examples, a camera could take an overhead view of the subject reposing on the subject support and a rough anatomical model could be fit to the image or photograph of the subject. This would also provide a rough or approximate location of the heart such that the heart can be moved into the predetermined region of interest within the magnet.

It is understood that one or more of the aforementioned embodiments of the invention may be combined as long as the combined embodiments are not mutually exclusive.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor or computational system of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the computational system of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the computational system. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a computational system. 'Computer storage' or 'storage' is a further example of a computer-readable storage medium. Computer storage is any non-volatile computer-readable storage medium. In some embodiments computer storage may also be computer memory or vice versa.

A 'computational system' as used herein encompasses an electronic component which is able to execute a program or machine executable instruction or computer executable code. References to the computational system comprising the example of "a computational system" should be interpreted as possibly containing more than one computational system or processing core. The computational system may for instance be a multi-core processor. A computational system may also refer to a collection of computational systems within a single computer system or distributed amongst multiple computer systems. The term computational system should also be interpreted to possibly refer to a collection or network of computing devices each comprising a processor or computational systems. The machine executable code or instructions may be executed by multiple computational systems or processors that may be within the same computing device or which may even be distributed across multiple computing devices.

Machine executable instructions or computer executable code may comprise instructions or a program which causes a processor or other computational system to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly. In other instances, the machine executable instructions or computer executable code may be in the form of programming for programmable logic gate arrays.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a computational system of a general purpose computer, special purpose computer, or other programmable data processing apparatus to produce a machine, such that the instructions, which execute via the computational system of the computer or other programmable data processing apparatus, create means for implementing the functions/acts specified in the flowchart and/or block diagram block or blocks.

These machine executable instructions or computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The machine executable instructions or computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, pedals, wired glove, remote control, and accelerometer are all examples of user interface components which enable the receiving of information or data from an operator.

A 'hardware interface' as used herein encompasses an interface which enables the computational system of a computer system to interact with and/or control an external computing device and/or apparatus. A hardware interface may allow a computational system to send control signals or instructions to an external computing device and/or apparatus. A hardware interface may also enable a computational system to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bi-stable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

K-space data is defined herein as being the recorded measurements of radio frequency signals emitted by atomic spins using the antenna of a Magnetic resonance apparatus during a magnetic resonance imaging scan. Magnetic resonance data is an example of tomographic medical image data. Motion resolved k-spaced data is k-space data that is either binned, sorted, or soft gated according to one or more motion phases of a subject. For example, the motion resolved k-space data could be sorted, binned, or soft gated according to the respiratory and/or cardiac phase of the subject.

A Magnetic Resonance Imaging (MRI) image or MR image is defined herein as being the reconstructed two- or three-dimensional visualization of anatomic data contained within the magnetic resonance imaging data. This visualization can be performed using a computer.

BRIEF DESCRIPTION OF THE DRAWINGS

In the following preferred embodiments of the invention will be described, by way of example only, and with reference to the drawings in which.

DESCRIPTION OF EMBODIMENTS

Like numbered elements in these figures are either equivalent elements or perform the same function. Elements which have been discussed previously will not necessarily be discussed in later figures if the function is equivalent.

Figure 1:
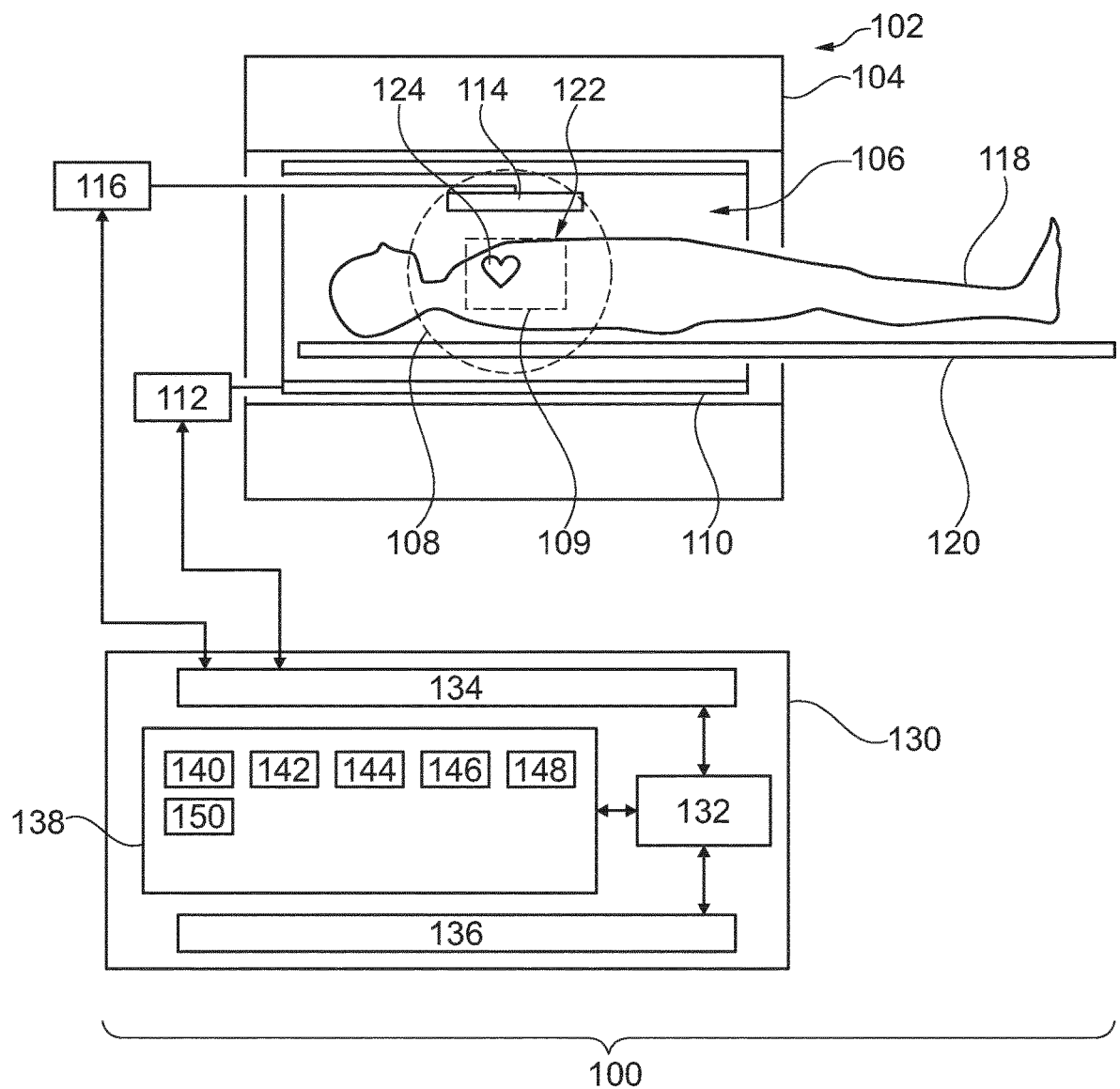
FIG. 1 illustrates an example of a medical system.

FIG. 1 illustrates an example of a medical system 100. The medical system 100 is shown as comprising a magnetic resonance imaging system 102 and a computer 130. The magnetic resonance imaging system 102 comprises a magnet 104. The magnet 104 is a superconducting cylindrical type magnet with a bore 106 through it. The use of different types of magnets is also possible; for instance it is also possible to use both a split cylindrical magnet and a so called open magnet. A split cylindrical magnet is similar to a standard cylindrical magnet, except that the cryostat has been split into two sections to allow access to the iso-plane of the magnet, such magnets may for instance be used in conjunction with charged particle beam therapy. An open magnet has two magnet sections, one above the other with a space in-between that is large enough to receive a subject: the arrangement of the two sections area similar to that of a Helmholtz coil. Open magnets are popular, because the subject is less confined. Inside the cryostat of the cylindrical magnet there is a collection of superconducting coils.

Within the bore 106 of the cylindrical magnet 104 there is an imaging zone 108 where the magnetic field is strong and uniform enough to perform magnetic resonance imaging. A predetermined region of interest 109 is shown within the imaging zone 108. The magnetic resonance data that is acquired typically acquired for the region of interest. A subject 118 is shown as being supported by a subject support 120 such that at least a portion of the subject 118 is within the imaging zone 108 and the predetermined region of interest 109.

Within the bore 106 of the magnet there is also a set of magnetic field gradient coils 110 which is used for acquisition of preliminary magnetic resonance data to spatially encode magnetic spins within the imaging zone 108 of the magnet 104. The magnetic field gradient coils 110 connected to a magnetic field gradient coil power supply 112. The magnetic field gradient coils 110 are intended to be representative. Typically magnetic field gradient coils 110 contain three separate sets of coils for spatially encoding in three orthogonal spatial directions. A magnetic field gradient power supply supplies current to the magnetic field gradient coils. The current supplied to the magnetic field gradient coils 110 is controlled as a function of time and may be ramped or pulsed.

Adjacent to the imaging zone 108 is a radio-frequency coil 114 for manipulating the orientations of magnetic spins within the imaging zone 108 and for receiving radio transmissions from spins also within the imaging zone 108. The radio frequency antenna may contain multiple coil elements. The radio frequency antenna may also be referred to as a channel or antenna. The radio-frequency coil 114 is connected to a radio frequency transceiver 116. The radio-frequency coil 114 and radio frequency transceiver 116 may be replaced by separate transmit and receive coils and a separate transmitter and receiver. It is understood that the radio-frequency coil 114 and the radio frequency transceiver 116 are representative. The radio-frequency coil 114 is intended to also represent a dedicated transmit antenna and a dedicated receive antenna. Likewise the transceiver 116 may also represent a separate transmitter and receivers. The radio-frequency coil 114 may also have multiple receive/transmit elements and the radio frequency transceiver 116 may have multiple receive/transmit channels. For example if a parallel imaging technique such as SENSE is performed, the radio-frequency could 114 will have multiple coil elements.

The transceiver 116 and the gradient controller 112 are shown as being connected to the hardware interface 106 of the computer system 102.

The subject 118 has been positioned within the bore of the magnet 106 such that a thoracic region 122 of the subject 118 is positioned within a predetermined region of interest 109. The subject's heart 124 is located within the predetermined region of interest 109. When the lines of k-space data 144 are acquired the heart 124 will automatically be imaged.

The medical system 100 is further shown as comprising a computer 130. The computer 130 is intended to represent one or more computing or computational devices located at one or more locations. The computer 130 is shown as containing a computational system 132. The computational system 132 is intended to represent one or more computational systems that could for example be one or more processing cores located at one or more locations. Various combinations of computational systems 132 and/or computers 130 could be connected and work together cooperatively using a network. The computational system 132 is shown as being in communication with a hardware interface 134, a user interface 136, and a memory 138. The hardware interface 134 is an interface which enables the computational system 132 to communicate with and/or control other components of the medical system 100 such as the magnetic resonance imaging system 102. The user interface 136 is a user interface that enables an operator of the medical system 100 to control and operate the medical system 100. The memory 138 is intended to represent various types of memory which may be in communication with the computational system 132.

The memory 138 is shown as containing machine-executable instructions 140. The machine-executable instructions 140 are instructions which enable the computational system 132 to perform various processes and tasks such as image processing, numerical calculations and control of the magnetic resonance imaging system 102. The memory 138 is further shown as containing pulse sequence commands 142. The pulse sequence commands as used herein are commands or data which may be converted into commands which enable the computational system 132 to control the magnetic resonance imaging system 102 to acquire k-space data such as lines of k-space data 144.

The pulse sequence commands 142 in this example are according to a three-dimensional free-running cardiac magnetic resonance imaging protocol. The pulse sequence commands are configured to repeatedly acquire lines of k-space data for the predetermined region of interest 109. As the lines of k-space data are repeatedly or continuously acquired the free-running nature of the pulse sequence commands 142 means that the lines of k-space data 144 will be acquired for a variety of motion states or phases of the subject 118.

They are not depicted in this Fig. but there may be systems or system for measuring the respiratory and/or cardiac phase for the movement of the subject 118. The memory 138 is further shown as containing motion resolved k-space data 146. The motion resolved k-space data 146 are the lines of k-space data 144 that are sorted or grouped using soft gating to make the k-space data have a reference to a particular motion state of the subject 118. For example, the motion resolved k-space data 146 may contain the data such that is it binned or soft gated for a range of cardiac and respiratory phases of the subject 118. The memory 138 is further shown as containing a portion of the motion resolved k-space data 148. This is a portion of the motion resolved k-space data 146 for a particular respiratory phase and at least one cardiac phase of the subject 118. The memory 138 is further shown as containing a preliminary three-dimensional cardiac image 150 that has been reconstructed from the portion of the motion resolved k-space data 148. This for example may be reconstructed using a compressed sensing algorithm.

Figure 2:
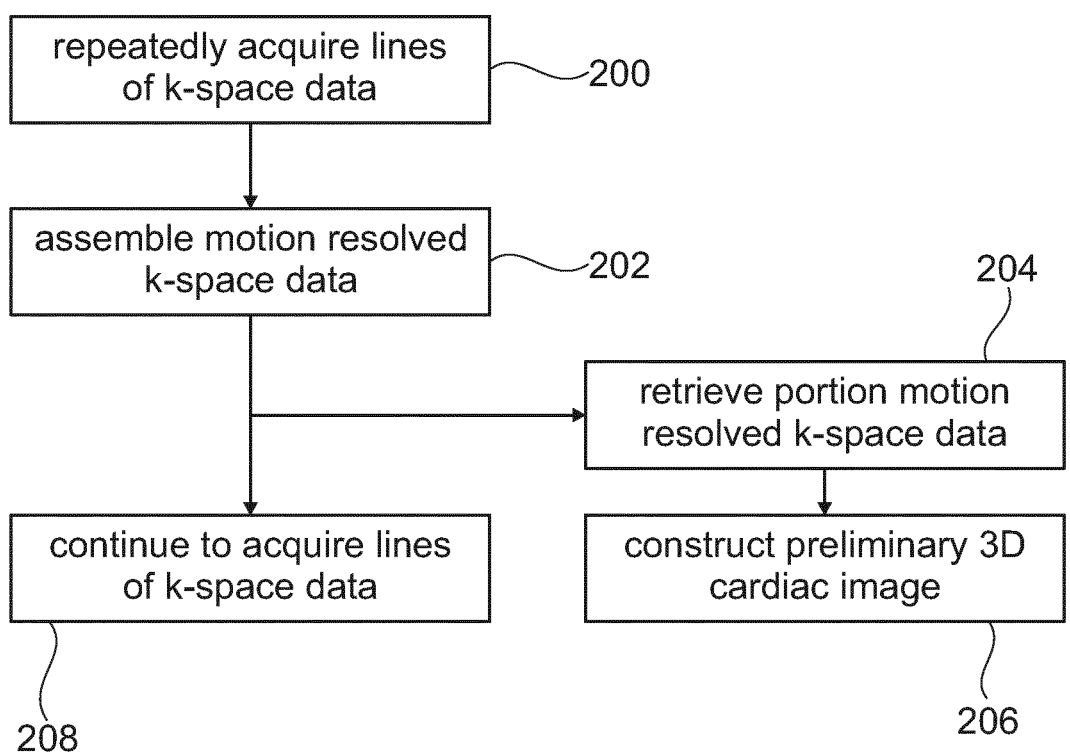
FIG. 2 shows a flow chart which illustrates a method of using the medical system of FIG. 1.

FIG. 2 shows a flowchart which illustrates a method of operating the medical system 100 of FIG. 1. First, in step 200, the lines of k-space data 144 are repeatedly or continuously acquired. Next, in step 202, the lines of k-space data 144 are assembled into motion resolved k-space data 146. The motion resolved k-space data 146 may be assembled using either sensor data, which indicates a cardiac and/or respiratory phase of the subject 118 or the lines of k-space data 144 themselves may be used. For example, self-navigation of the lines of k-space data 144 may be used. It should be noted that step 202 may occur concurrently with step 200 so that as additional lines of k-space data 144 are acquired, they may be continuously assembled into the motion resolved k-space data so that as the acquisition of the lines of k-space data 144 progress, the quality of the motion resolved k-space data 146 continually improves. In step 204 the method shows that a portion of the motion resolved k-space data 148 is retrieved from the assembled motion resolved k-space data 202.

This for example may be for a single respiratory phase and a number of cardiac phases. For example, at least one cardiac phase or even several cardiac phases adjacent to this one or chosen cardiac phase. The method proceeds to step 206, where a preliminary three-dimensional cardiac image 150 is reconstructed from the portion of the motion resolved k-space data 148. The reconstruction of the three-dimensional cardiac image 150 may for example be achieved using a compressed sensing algorithm as the portion of the motion resolved k-space data 148 may be undersampled. The method after step 202 is shown as also going to step 208 where the lines of k-space data 144 are continued or continually acquired. In FIG. 2 the intention is to show that the preliminary 3D cardiac image 150 is constructed before the lines of k-space data are finished being acquired. This has the advantage that the preliminary 3D cardiac image is available as soon as the lines of k-space data have finished being acquired. This may greatly accelerate the procedure of imaging the subject 118.

Figure 3:
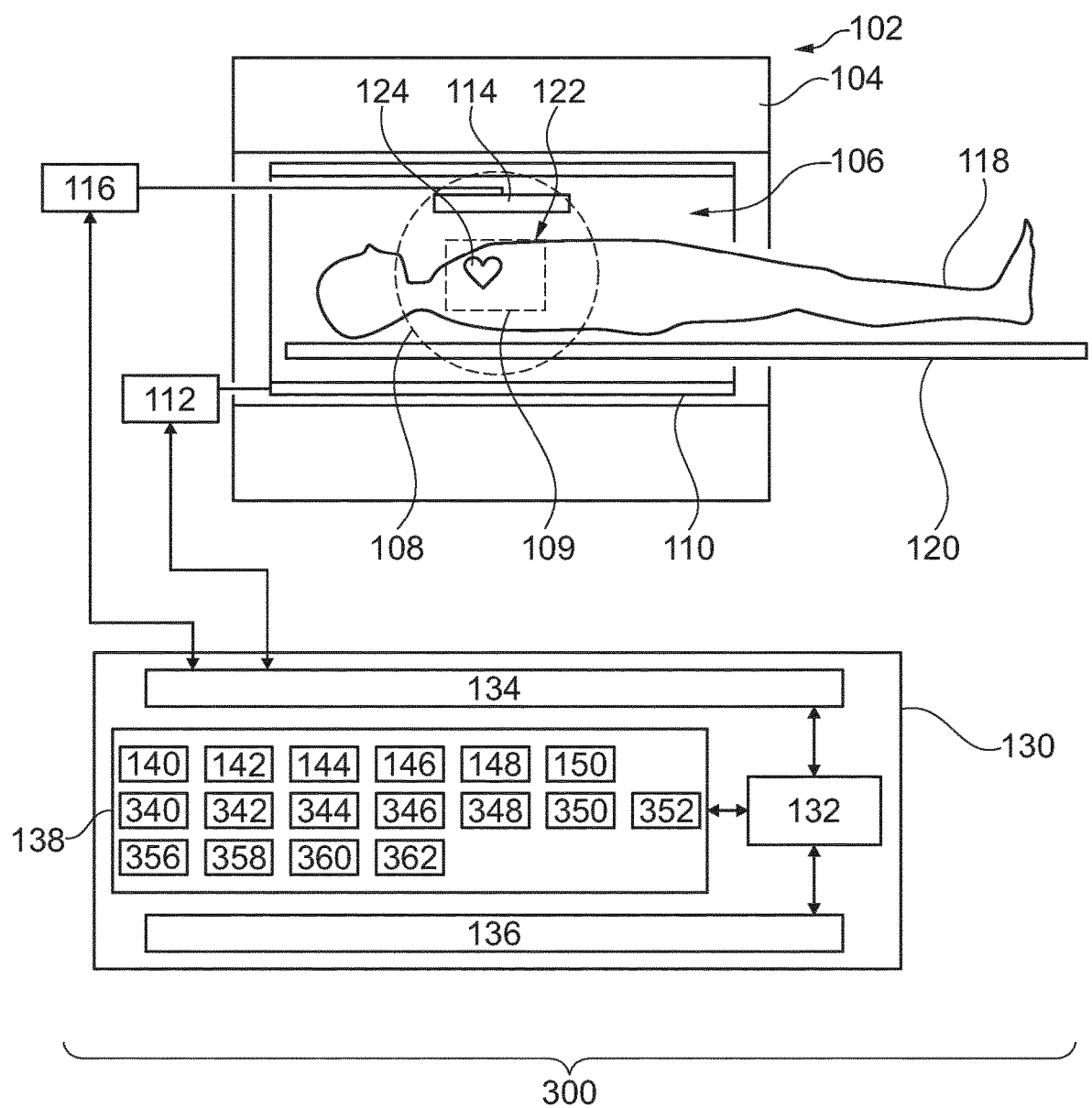
FIG. 3 illustrates a further example of a medical system.

FIG. 3 shows a further example of a medical system 300. The medical system 300 depicted in FIG. 3 is similar to the medical system 100 depicted in FIG. 1. The medical system 300 in FIG. 3 contains additional data over the system 100 depicted in FIG. 1. The memory 138 is further shown as containing a deformable cardiac model 340. The deformable cardiac model 340 for example may be a three-dimensional model of a heart that contains anatomical landmarks as well as a set of planes 146 which are defined within it. The deformable cardiac model 340 contains a specification of an elastic relationship between various anatomical components of the heart so that when it is deformed or stretched to fit to a heart 124 of the subject, it remains smooth and realistic. The memory 138 further contains a fitted cardiac model 342. The fitted cardiac model 342 is constructed by fitting the deformable cardiac model 340 to the preliminary three-dimensional cardiac image 150. This automatically positions a set of planes 346. The set of planes 346 may for example be useful in positioning additional magnetic resonance imaging locations as well as providing a set of places where the data can be viewed from.

The memory 138 is further shown as containing at least one cardiac viewing plane 348 that was defined by the set of planes 346 and positioned correctly by the fitted cardiac model 342. The memory 138 is further shown as containing a cine image sequence 350 that was reconstructed from the motion resolved k-space data 146 after the lines of k-space data 144 have been completely acquired and used to construct the motion resolved k-space data 146. The memory 138 is further shown as containing a rendering of the cine image sequence 352 viewed from the at least one cardiac viewing plane 348. The rendering 352 may for example be displayed using the user interface 136. Various algorithms may be used to detect a cardiac anomaly 354 in either the cine image sequence 350 or the fitted cardiac model 342. Once a cardiac anomaly 354 has been detected a workflow database 356, which is shown as being located in the memory 138 but may also be located across a network at a remote location. The workflow database 356 contains a number of workflows which are referenced or keyed by a type of cardiac anomaly 354. By querying the workflow database 356 with the identified cardiac anomaly 354 a recommended imaging workflow 358 may be recovered or provided to the computational system 132. The recommended imaging workflow 358 may then of course be displayed using the user interface 136. The recommended imaging workflow 358 may for example contain instructions 360 for the operator as well as further pulse sequence commands 362. The further pulse sequence commands 362 could be arranged as a template and the set of planes 346 from the fitted cardiac model 342 may be used to automatically configure these further pulse sequence commands 362.

Figure 4:
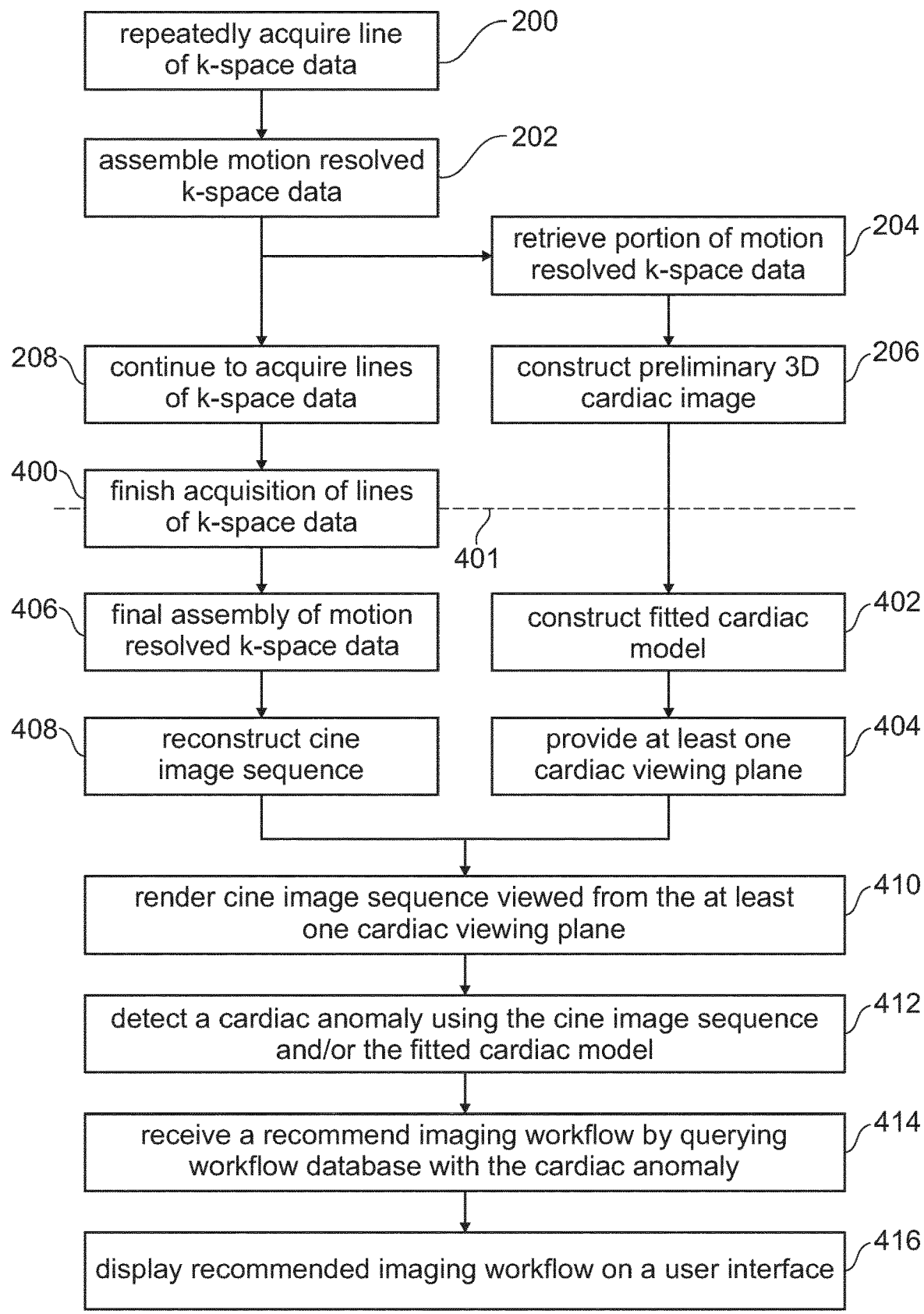
FIG. 4 shows a flow chart which illustrates a method of using the medical system of FIG. 3.

FIG. 4 shows a flowchart which illustrates a method of operating the medical system 300 of FIG. 3. The method illustrated in FIG. 4 is similar to the method illustrated in FIG. 2. The method illustrated in FIG. 4 performs steps 200, 202, 204, 206, and 208 as was illustrated in FIG. 2.

After step 208 is performed the method is shown as going to step 400 and this is the finishing of the acquisition of the lines of k-space data 144. The dashed horizontal line 401 indicates a point in time when the acquisition of the k-space data 144 has been finished. It can be seen clearly that step 206, where the preliminary three-dimensional cardiac image is constructed is performed before the time point 401. After step 206 is performed the portion of the preliminary 3D cardiac image is used to construct the fitted cardiac model 342 from the deformable cardiac model 340. After the fitted cardiac model has been provided in step 402, step 404 is performed. In step 404 the at least one cardiac viewing plane 348 is provided. In this Fig. steps 402 and 404 are shown as being performed after time 401. However, both steps 402 and 404 may be performed before time 401.

Returning to step 400, after the lines of k-space data are finished being acquired the method proceeds to step 406. In step 406 if the motion resolved k-space data 146 has not been fully assembled, the fully assembled motion resolved k-space data is provided in step 406. Next, in step 408, the reconstructed cine image sequence is reconstructed from the motion resolved k-space data 146. In this method it can be seen that there are essentially two concurrent branches to the method. This results in an enormous time savings and accelerates the entire time of the method presented in FIG. 4. After steps 408 and 404 have both been completed, the method then goes to a sequence where step 410 is first performed. In step 410 the cine image sequence 350 is rendered such that is it viewed from the at least one cardiac viewing plane. What this provides is that the operator of the medical system 300 is able to see the cine image sequence as soon as it is reconstructed and it is positioned correctly. The operator either does not need to position the viewing planes or may only adjust them a minor amount. This results in a huge time savings.

Next, in step 412, a cardiac anomaly is detected using the cine image sequence 350 or the fitted cardiac model 342. For example, the pumping fraction or the dimensions of the heart, as defined by the fitted cardiac model 342 or measured in the cine image sequence 350, may indicate that the subject has a cardiac anomaly. This cardiac anomaly can be used to query the workflow database 356. Next, in step 414, the cardiac anomaly 354 is used for just this and the workflow database 356 is used to query the workflow database 356 and a recommended imaging workflow 358 is returned. Then, in step 416, the recommended imaging workflow 358 is displayed using the user interface 136. This may be provided in different ways in different examples. For example, the system may be set up automatically and the operator may simply accept the recommendations of the recommended imaging workflow 358 including using the set of planes 346 from the fitted cardiac model 342 to automatically adjust the position of regions of interest for the further pulse sequence commands 362. In other examples, the instructions 360 may merely provide instructions for the trained operator to perform, so it may in one instance provide an automatic operation and, in another instance, provide recommendations or guidance for the trained operator.

Figure 5:
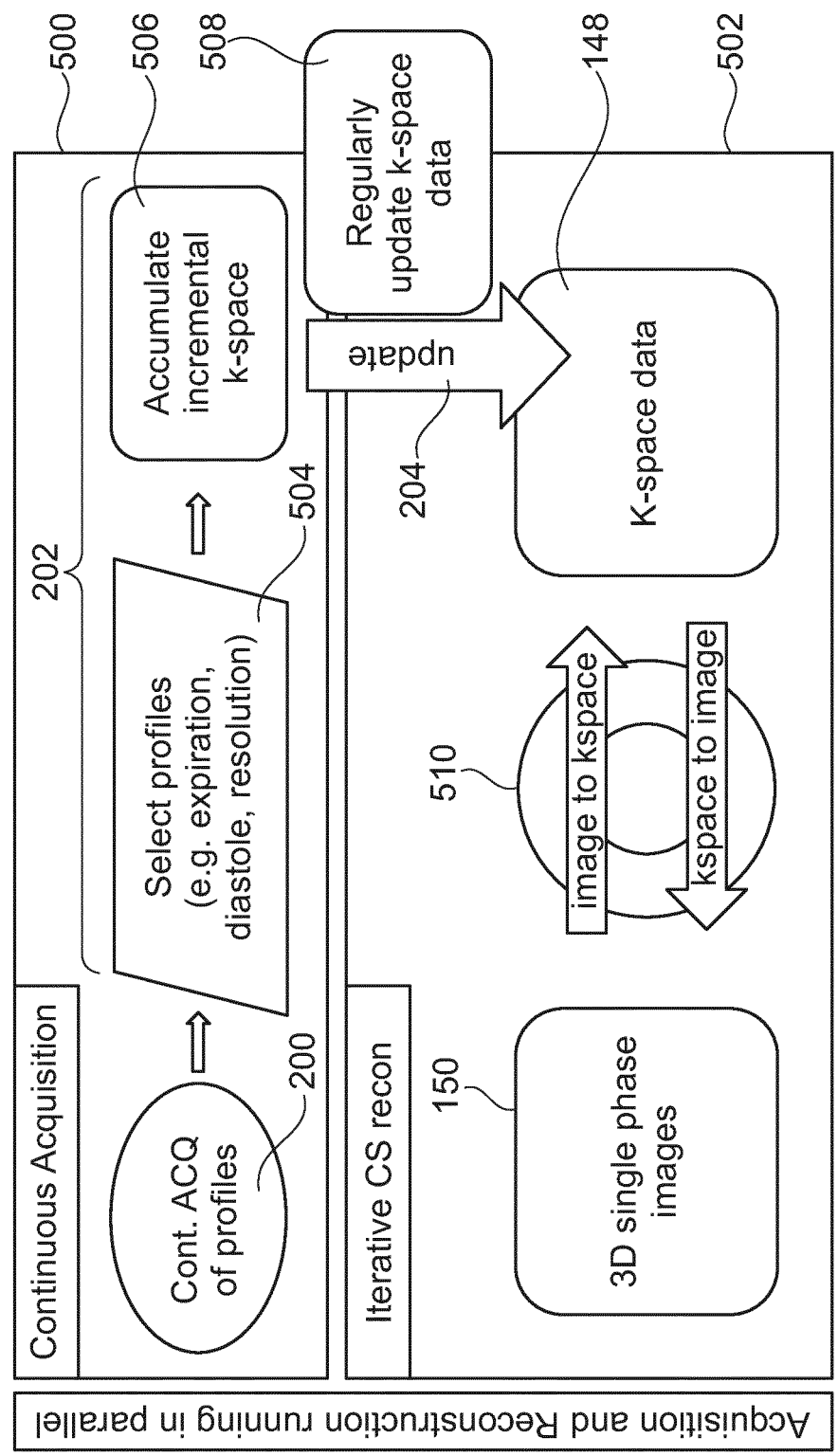
FIG. 5 illustrates a method of continually updating the k-space data during a compressed sensing reconstruction of a magnetic resonance image.

In FIGS. 2 and 4, the steps 200, 202, 204, and 206 are represented in a linear fashion. That is to say the portion of the motion resolved k-space data 148 appears to be retrieved only once from the motion resolved k-space data 146. This is one way of performing this; however, an alternative is presented in FIG. 5. The steps presented in FIG. 5 may be used to modify the method illustrated in both FIGS. 2 and 4. In FIG. 5, there are two main steps which are shown; this is a continuous acquisition 500 of the lines of k-space data 144 and a compressed sensing reconstruction 502 of the preliminary three-dimensional cardiac image 150. The continuous acquisition part comprises step 200, which is the continuous acquisition of profiles or the lines of k-space data.

The assembly of the motion resolved k-space data 202 is described as a selection of profiles for example, on the expiration distal and resolution in step 504 and these are accumulated 506 to provide an incremental k-space data. Step 204 is the update of the k-space data 148. This shows that the k-space data is regularly updated in step 508. As opposed to a single retrieval of the portion of the motion resolved k-space data, as is shown in FIGS. 2 and 4, this is performed repeatedly, for example, after every acquisition of the k-space data or after a certain predetermined number of lines of k-space data. The portion of the motion resolved k-space data 148 is then used in a compressed sensing image reconstruction 510.

In compressed sensing an image is reconstructed using a sparse transform which is typically filtered for noise and then the k-space data 148 is then modified and used for data consistency and then used for a further iteration. This then results in the 3D single phase images or the preliminary three-dimensional cardiac image 150. The method presented in step 5 is different from a typical compressed sensing algorithm. Only when performing compressed sensing the data used for the image reconstruction is k-space data which is sampled and then provided and then used for the entire image reconstruction. In this case the pool of k-space data used for the compressed sensing image reconstruction is continually or regularly updated.

Cardiac MRI (CMR) is a clinical procedure to assess, among other cardiac anatomy, heart motion, myocardial perfusion and scar of hibernating tissue via late enhancement (LGE) after contrast injection, to name some examples. In many of these application quantification plays a role to get functional parameters like the ejection fraction, or others. Despite the highly valued diagnostic information, CMR techniques are only used in expert imaging centers. Major roadblocks are the complex procedure, long overall acquisition time and a high burden to the patient (breath holds). This invention describes a workflow, which combines known, advanced CMR techniques, image reconstruction, image processing and decision support techniques in a favorable manner which enables to solve the described problems and roadblocks, facilitating patient adapted CMR exams within 10-30 minutes, improving the reproducibility of results across imaging centers with different levels of expertise. It is based on a highly accelerated, unplanned 4D/5D cardiac acquisition in combination with a fast image reconstruction in different stages, which timely provides all data, as well as automated planning/MPR and decision support modules for a simplified adaptation to different disease representations.

In a routine CMR workflow, a large number of manual planning steps and a large number of individual breath holds are beneficial. Up to 6 minutes of the overall exam time is typically used to identify and geometrically plan interactively the essential cardiac view orientations like short-axis (SA), 4-chamber (4-ch), 3-chamber (3-ch) or 2-chamber (2-ch) views. This procedure uses highly trained personnel and is one essential roadblock for wide adoption of CMR. Another aspect that uses expert support during CMR acquisition is a decision for contrast injection for perfusion/LGE, which is dependent on the initial assessment of the disease using information on the cardiac anatomy and function provided by initial MR scans.

Further, most of the contrast and functional imaging types are acquired slice (package) by slice (package), each using a separate breath hold of the patient. Breath holds are a severe burden to patients with cardiac symptoms scheduled for CMR, which often goes along with shortness of breath or chest pain and is a frequent source of premature MR procedure aborts. Contrast injections are typically used for assessment of myocardial perfusion and for assessment of scar tissue in late enhancement (late gadolinium enhancement, LGE).

Geometrical planning could be fully automated, a decision support could be provided to facilitate/simplify decisions for contrast injections and the MRI scans should be performed while the patient is breathing freely, which all use dedicated techniques that are combined in a suitable workflow leading to minimized exam times and wide accessibility including routine radiology settings.

While 4D/5D non-angulated ("unplanned") free breathing whole heart CMR techniques are known, they suffer from long reconstruction times. Thus, information on cardiac anatomy and function is not available in a timely manner during the workflow, to allow on the fly decisions on further contrasts and to provide automatic planning of angulated cardiac views for image contrasts, that cannot (yet) be performed in a non-angulated fashion.

Examples describe a workflow, which combines known, advanced CMR techniques, image reconstruction, image processing and decision support techniques in a favorable manner which enables to solve the described problems and roadblocks.

The example workflow is based on a highly accelerated, unplanned, non-contrast enhanced 4D cardiac acquisition, acquired in a standard fixed geometry, in combination with a fast image reconstruction, which provides all data for (i) automatic anatomical planning of all heart views, (ii) diagnostic information on cardiac anatomy, (iii) diagnostic information on cardiac function (e.g. ejection fraction/wall thickness), (iv) refinement of the disease classification to support the selection of further image contrasts/contrast injection.

This 4D cardiac acquisition provides an isotropic 3D representation covering the whole chest, separated in multiple phases (for example in at least 5, 8, 10, or 12 phases) over the cardiac cycle, representing one selected respiratory state (e.g. end-expiration). Thus, it does not require any upfront geometrical planning or angulation.

In the example workflow, information for (i) is reconstructed via fast (e.g. GPU based) algorithms from a subset of the 4D data, starting well before the end of the running 4D acquisition, such that further automatic planning steps can be already performed and are ready together with the reconstruction of the diagnostic data (ii) and (iii).

Using initial disease classification at the time of the CMR prescription together with the information available from (i), (ii) and (iii), comprehensive information is available for an appropriate decision support algorithm (known in the art) which proposes the further execution of image acquisition steps for the selection by the operator, or a termination of the CMR exam (when function and anatomy is sufficient for diagnosis of this case)

Figure 6:
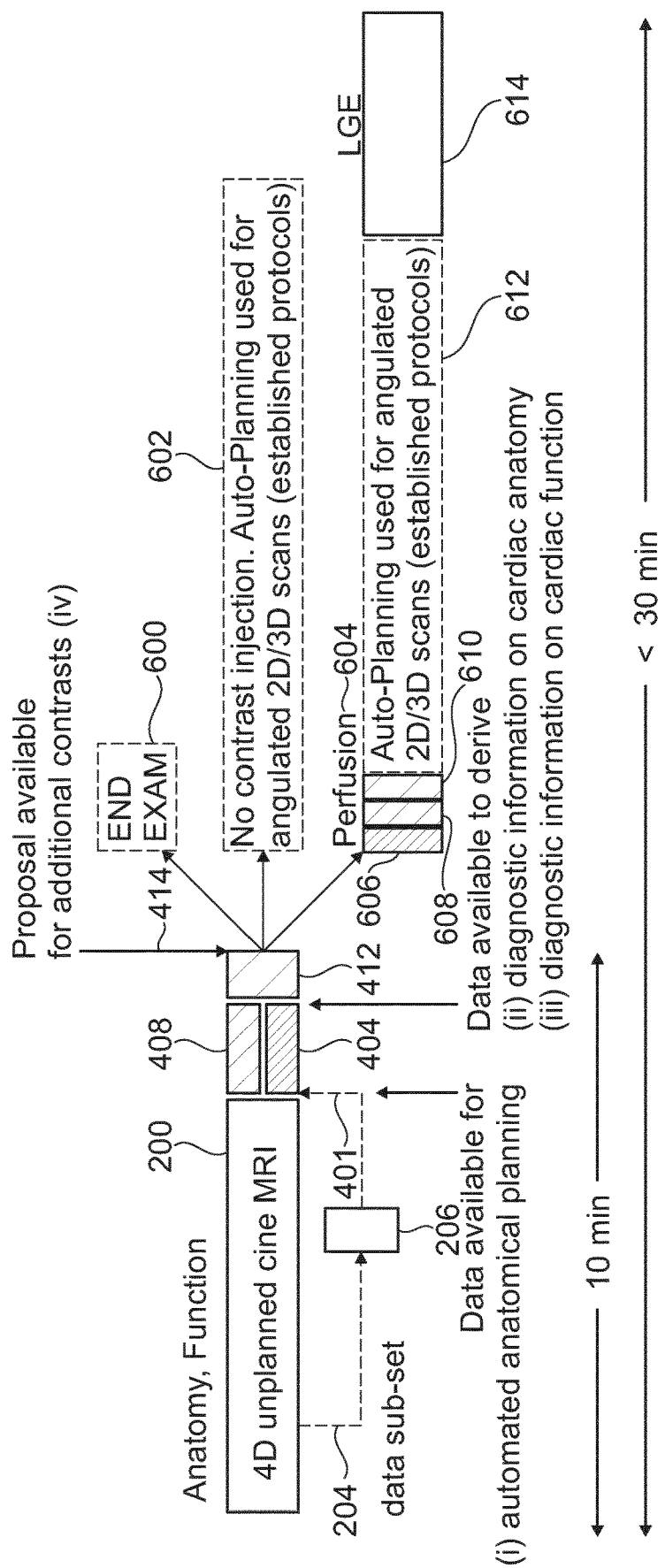
FIG. 6 illustrates a further method of operating a medical system.

FIG. 6 below shows a detailed visualization of an example workflow. The noted CMR image contrasts are exemplary and can comprise any known CMR technique to be performed after the initial automated scanning, processing and planning phase. FIG. 6 shows a flowchart that represents this workflow. It provides an alternate explanation of the method presented in FIG. 4. FIG. 6 illustrates how the entire procedure can be performed in under 30 minutes. In step 200 a four-dimensional unplanned cine magnetic resonance imaging protocol is performed and is equivalent to the repeated acquisition of lines of k-space data in step 200. The dashed line 204 shows that a portion of the motion resolved k-space data is retrieved. This is used to construct the preliminary 3D cardiac image 206.

When the unplanned cine MRI acquisition 200 is finished at time 401, the data is now available for automated anatomical planning. The method is then shown as proceeding in two different branches. The block 408 represents a reconstruction of the cine image sequence. Using current technology, the reconstructions in step 206 and 408 could for example be reconstructed using a graphical processing unit. As step 408 is being performed, step 404 has already finished or has also been performed where the automated planning is performed. This is equivalent to fitting a cardiac model to the preliminary three-dimensional cardiac image 150. When both of these are finished the method proceeds to step 412, which in this example is a guided decision-making process. When this is finished the method arrives at step 414, which is to receive a recommended imaging flow by querying a workflow database with the cardiac anomaly.

The user may then receive one or more different recommendations. A first recommendation would be 600 to end the examination. Another recommendation would be to perform additional imaging 602 with no contrast injection. For example, automated planning using angulated 2D or three-dimensional scans could be performed using established magnetic resonance imaging protocols. A third option would be that the recommendation is performed perfusion imaging 604. This could involve a variety of steps. This would for example involve a contrast injection 606, then providing the subject with breath hold instructions 608. During the breath hold instructions 608 a breath hold scan 610 may be performed. Then additionally there may be automated planning using angulated two-dimensional and three-dimensional scans 612, and then finally, late gadolinium enhancement imaging 614 could be performed. These steps are described in more detail below.

A cardiac 4D cine MR scan 200 (repeatedly acquire the lines of k-space data) is performed just after positioning the subject 118 on the subject support 120, without upfront geometrical planning or angulation ("unplanned"). This may be, for example, a Cartesian or radial 4D acquisition with isotropic voxel size (e.g. 1.5×1.5×1.5 mm3) accelerated via compressed sensing in spatial and time or cardiac phase or respiratory dimensions, or via deep learning methods (sub-sampling for AI reconstruction). The reconstruction 408 (for example a "Fast GPU reconstruction") may to be selected to ensure, that image information with diagnostic quality is available within a few minutes after completion of the 4D acquisition 200.

It is also possible to use 5D acquisitions and reconstructions for 200 in this proposed workflow (resolving the respiratory dimension in addition to the heart-phase time dimension).

Well before finishing the 4D scan 200, as subset (portion of motion resolved k-space data 148) of the acquired data (motion resolved k-space data 148) is sent to a fast reconstruction module 206, which reconstructs an image dataset (e.g. 3D, one heart phase, possibly low resolution) suitable for detecting the anatomical location and orientation of the heart for automated angulation and planning of the heart views by processing module 404 "automated planning/MPR".

After finishing the MR acquisition 401, both modules 404 and 408 can run in parallel because the data is already available for (i) automated anatomical planning. Automated anatomical planning may e.g. be performed by adjusting a heart model, which may also provide information on anatomical malformations to be used in 412 (see below). After finishing 408, the detected scan orientations (at least one cardiac viewing plane 348) can be used to immediately display anatomical images and cine data (cine image sequence 350) in orientations (e.g. short axis view) via MPR (multi planar reformat).

With this data (cine image sequence 350) available, a decision support module 412 can be started in parallel to the (brief) image review of the operator. Based on all information available (initial disease classification, anatomical information e.g. heart malformations detected by the model adaptation, functional deficits, etc. (cardiac anomaly 354)), a suggestion (recommended imaging workflow 358) is made, which further steps are advised in the CMR exam. The actual decision will be made by the operator (or with consultation of a radiologist/cardiologist, who can be provided with the same information, including remote operation).

If the present patient can be fully diagnosed based on anatomical and functional information, option 600 may be to finish the exam. This would allow a full CMR exam within 10 minutes. If further diagnostic information is desired, but injection of contrast agent is not indicated, non-contrast enhanced scans may be added, following option 602. If contrast injection is indicated, e.g. for perfusion or late gadolinium enhancement, option 604 may be followed in the workflow. Planning for the subsequent scans for options 602 or 604, which may be angulated 2D/multi-slice scans, angulated 3D scans or non-angulated 3D scans, can be done fully automatically based on the information provided by module 404.

For case 604, where a contrast injection 606 is suggested, the workflow may be carefully adjusted to allow the quick assessment of first pass perfusion (possibly also including stress medication) and also to include sufficient time (10-15 min) until the LGE contrast is established.

Here, it is proposed to first inject contrast 606, give breath hold instructions 608 for a multi-slice 2D or 3D perfusion scan 610. When suitable techniques are available in the future, 608 and 610 could in be replaced by a free-breathing perfusion scan. The waiting time until LGE can be measured may be suitably filled with other 2D/multi-slice/3D acquisitions 612 (e.g. rest perfusion, quantitative CMR like T1, T2, T2* mapping, MR Fingerprinting . . . ). Finally, for option 604, a free breathing LGE scan 614 can be performed (e.g. angulated 3D acquisition).

Figure 7:
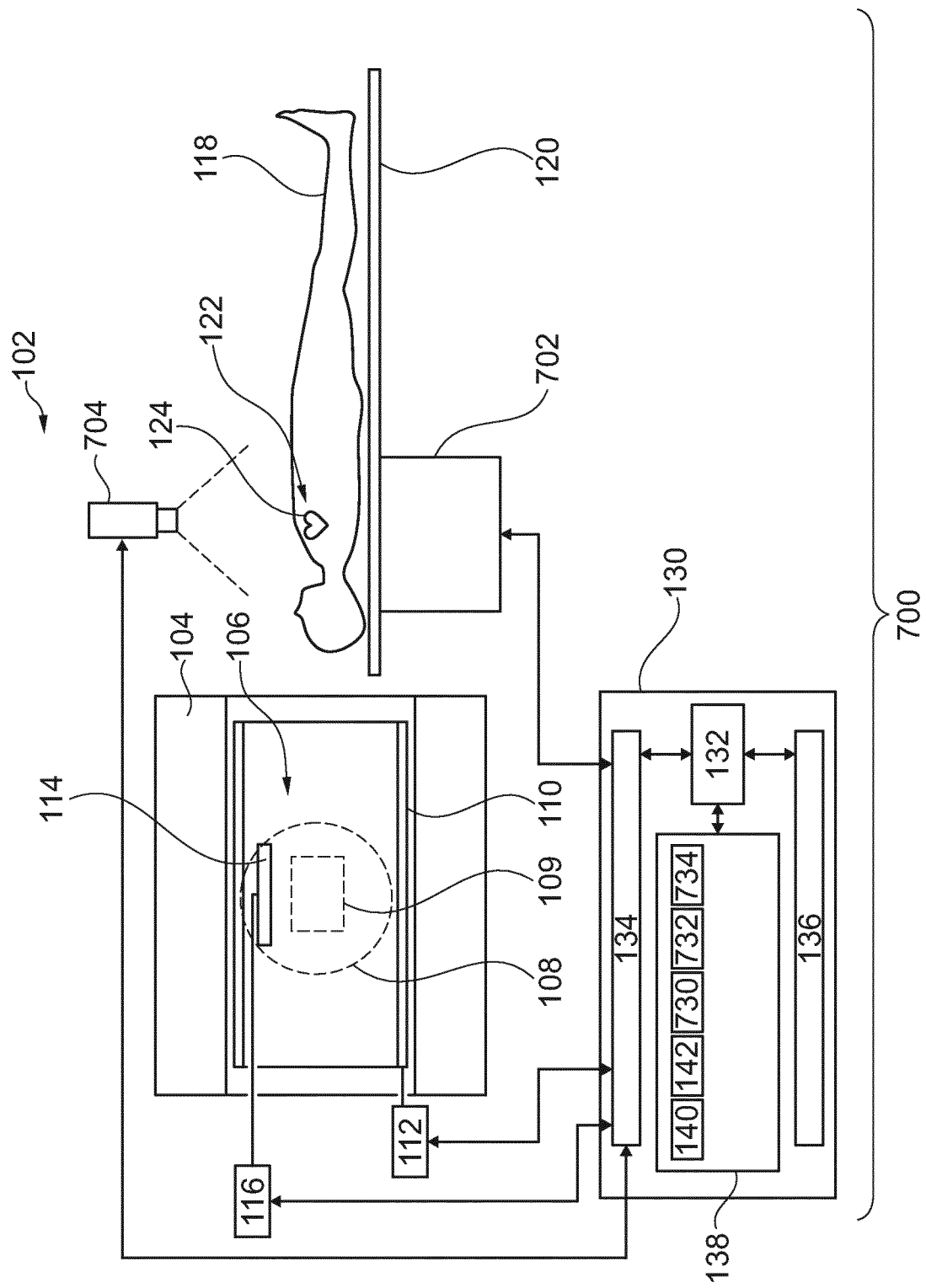
FIG. 7 illustrates a further example of a medical system.

FIG. 7 illustrates a further example of a medical system 700. The medical system 700 depicted in FIG. 7 is similar to the medical system depicted in FIG. 1 except that it is shown as additionally comprising a camera system 704 configured for imaging the thoracic region 122 of the subject 118 when the subject is outside of the bore 106 of the magnet 104 and also additionally an actuator 702 configured for moving the subject support 120 such that the heart 124 is moved into the predetermined region of interest 109.

The features of FIG. 7, as illustrated in the medical system 700, may be combined with the features of the medical system 100 in FIG. 1 and the medical system 300 in FIG. 3.

In FIG. 7 it can be shown that the predetermined region of interest 109 is sent ahead of time before the subject 118 is moved into the bore 106 of the magnet 104. The predetermined region of interest 109 is also significantly larger than the subject's heart 124. This makes it easier for a minimally trained operator to properly perform an example of a method as illustrated herein. There are a variety of ways how an operator could position the heart 124 within the predetermined region of interest 109. For example, an operator may make a rough estimation and mark this on a table or a laser pointer so that this position is identified. In this particular example there is a camera 704 positioned above the subject 118 to image the subject 118.

The operator could then for example use a mouse and point on a likely location of the heart and provide a likely heart location 734 manually. The memory 138 is shown as containing a subject image 730 of the subject 118. An alternative to the operator identifying the likely heart location 734 manually would be to perform an image segmentation 732. This could be done with an image segmentation algorithm or a neural network that is for example trained to estimate the location of joints and/or organs of the subject 118. The memory 138 is shown as containing a representative image segmentation 732 to represent one of these possibilities. From this image segmentation 732 or from manual identification, there is a likely heart location 734. The likely heart location 734 is then used to control the actuator 702 to move the subject support 120 and the subject 118 such that the heart 124 is positioned within the predetermined region of interest 109.

Figure 8:
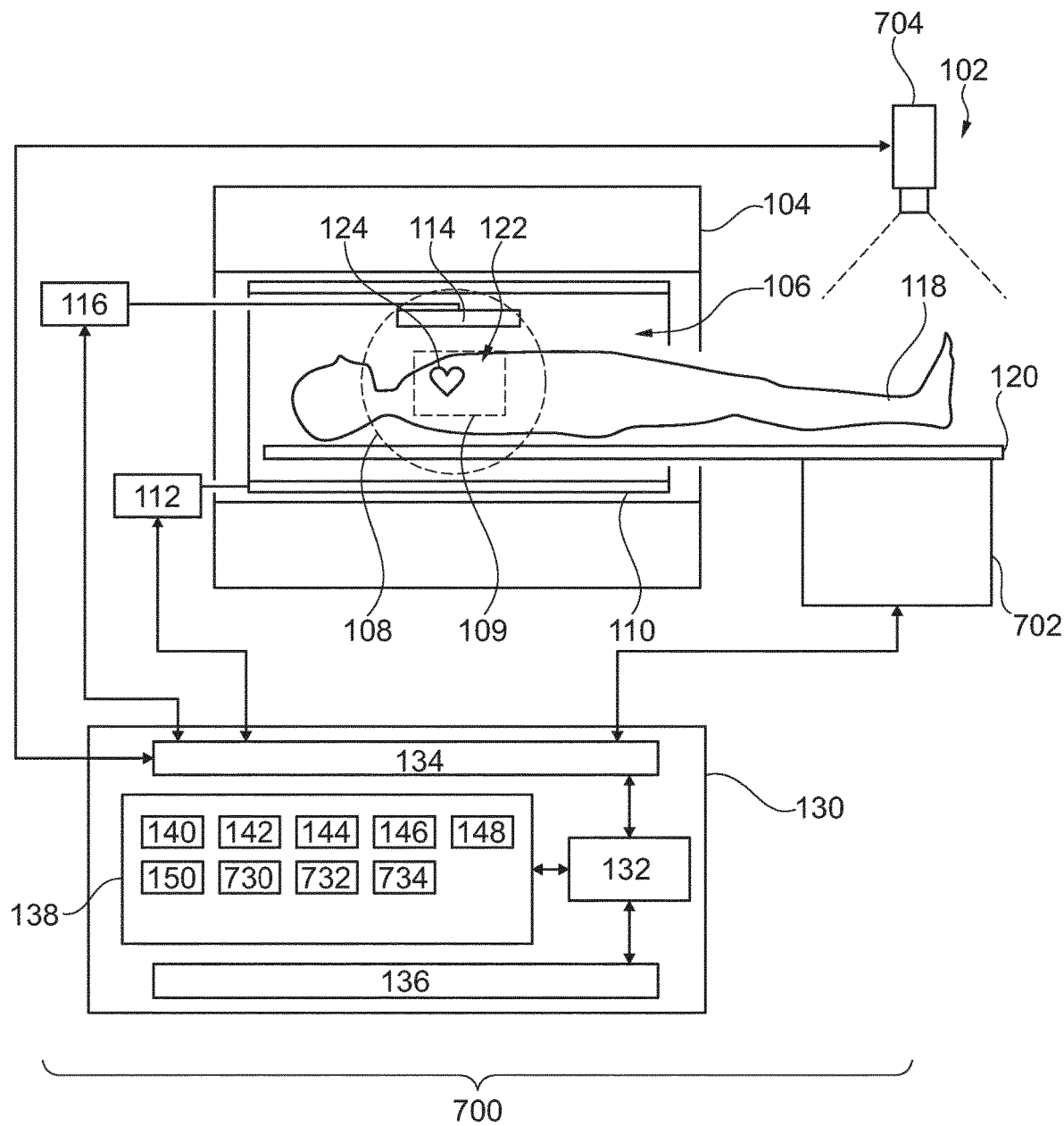
FIG. 8 shows a further view of the medical system of FIG. 7.

FIG. 8 shows another view of the medical system 700 after the subject has been positioned such that the heart 124 is within the predetermined region of interest 109. It can then be seen that the medical system 700 is now in the same configuration as was illustrated in FIG. 1. The pulse sequence commands 142 can then be used to perform the method as is illustrated in FIG. 2 or also as is illustrated in FIG. 4.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

REFERENCE SIGNS LIST

- 100 medical system
- 102 magnetic resonance imaging system
- 104 magnet
- 106 bore of magnet
- 108 imaging zone
- 109 predetermined region of interest
- 110 magnetic field gradient coils
- 112 magnetic field gradient coil power supply
- 114 radio-frequency coil
- 116 transceiver
- 118 subject
- 120 subject support
- 122 thoratic region
- 124 heart
- 130 computer
- 132 computational system
- 134 hardware interface
- 136 user interface
- 138 memory
- 140 machine executable instructions
- 142 pulse sequence commands
- 144 lines of k-space data
- 146 motion resolved k-space data
- 148 portion of motion resolved k-space data
- 150 preliminary three-dimensional cardiac image
- 200 repeatedly acquire the lines of k-space data by controlling the magnetic resonance imaging system with the pulse sequence commands
- 202 repeatedly assemble motion resolved k-space data from the lines of k-space data using at least one cardiac phase and one respiratory phase of the subject as the k-space data is acquired
- 204 retrieve at least a portion of the motion resolved k-space data during acquisition of the k-space data
- 206 construct a preliminary three-dimensional cardiac image using at least a portion of the motion resolved k-space data before acquisition of the lines of k-space data is finished
- 208 continue to acquire lines of k-space data
- 300 medical system
- 340 deformable cardiac model
- 342 fitted cardiac model
- 346 set of planes
- 348 at least one cardiac viewing plane
- 350 cine image sequence
- 352 rendering of cine image sequence from the at least one cardiac viewing plane
- 354 cardiac anomaly
- 356 workflow database
- 358 recommended imaging workflow
- 360 instructions
- 362 further pulse sequence commands
- 400 finish acquisition of lines of k-space data
- 401 time when acquisition of lines of k-space data finished
- 402 construct a fitted cardiac model by fitting the deformable cardiac model to the preliminary three-dimensional cardiac image
- 404 provide the a least one cardiac viewing plane
- 406 final assembly of motion resolved k-space data
- 408 reconstruct the cine image sequence from the motion resolved k-space data after the acquisition of the k-space data is completed
- 410 render at least a portion of the cine image sequence from the at least one cardiac viewing plane
- 412 detect a cardiac anomaly using the cine image sequence and/or the fitted cardiac model
- 414 receive a recommended imaging workflow by querying a workflow database with the cardiac anomaly
- 416 display the recommended imaging workflow on the user interface
- 500 continuous acquisition of k-space data
- 502 iterative compressed sensing reconstruction of preliminary three-dimensional cardiac image
- 504 select profiles
- 506 accumulate incremental k-space data
- 508 regularly update k-space data
- 510 iterative compressed sensing reconstruction
- 600 workflow option: end examination
- 602 workflow option: no contrast injection
- 604 workflow option: perfusion imaging
- 606 contrast injection
- 608 breath hold instructions
- 610 breath hold scan
- 612 Auto planning used for angulated 2D/3D scans
- 614 late Gadolinium enhancement imaging
- 700 medical system
- 702 actuator
- 704 camera system
- 730 subject image
- 732 image segmentation
- 734 likely heart location

The invention claimed is:

1. A medical system comprising: a magnetic resonance imaging system configured to acquire lines of k-space data from a thoracic region of a subject; a memory configured to store machine executable instructions and pulse sequence commands, wherein the pulse sequence commands are configured to repeatedly acquire the lines of k-space data according to a three-dimensional free running cardiac magnetic resonance imaging protocol, wherein the pulse sequence commands are configured to repeatedly acquire the lines of k-space data for a predetermined region of interest, wherein the memory further comprises a deformable cardiac model, wherein the deformable cardiac model is three-dimensional, wherein the deformable cardiac model memory further defines a set of planes; a computational system, wherein execution of the machine executable instructions causes the computational system to: repeatedly acquire the lines of k-space data by controlling the magnetic resonance imaging system with the pulse sequence commands; repeatedly assemble motion resolved k-space data from the lines of k-space data using at least one cardiac phase and one respiratory phase of the subject as the k-space data is acquired; retrieve at least a portion of the motion resolved k-space data during acquisition of the k-space data; construct a preliminary three-dimensional cardiac image using at least a portion of the motion resolved k-space data before acquisition of the lines of k-space data is finished; construct a fitted cardiac model by fitting the deformable cardiac model to the preliminary three-dimensional cardiac image, wherein fitting the deformable cardiac model to the preliminary three-dimensional cardiac image adjusts the location of the set of planes in the fitted cardiac model, wherein the set of planes comprises at least one cardiac viewing plane; and provide the at least one cardiac viewing plane.

2. The medical system of claim 1, wherein the three-dimensional free running cardiac magnetic resonance imaging protocol is a functional cardiac imaging protocol configured for reconstructing a cine image sequence, wherein the medical system further comprises a user interface, wherein execution of the machine executable instructions further causes the computational system to:
reconstruct the cine image sequence from the motion resolved k-space data after the acquisition of the k-space data is completed, wherein the fitting of the deformable cardiac model to the preliminary three-dimensional cardiac image begins before or concurrently with the reconstruction of the cine image sequence; and
render at least a portion of the cine image sequence viewed from the at least one cardiac viewing plane.

3. The medical system of claim 2, wherein execution of the machine executable instructions further causes the computational system to:
detect a cardiac anomaly using the cine image sequence and/or the fitted cardiac model;
receive a recommended imaging workflow by querying a workflow database with the cardiac anomaly, wherein the workflow database comprises multiple magnetic resonance imaging workflows each referencing at least one cardiac anomaly identifier, wherein the workflow database is configured to return the recommended imaging workflow by matching the cardiac anomaly to the cardiac anomaly identifier of the recommended imaging workflow; and
display the recommended imaging workflow on the user interface.

4. The medical system of claim 3, wherein the recommended imaging workflow comprises further pulse sequence commands, wherein execution of the machine executable instructions further causes the computational system to configure a geometrical orientation of further pulse sequence commands using the set of planes from the fitted cardiac model.

5. The medical system of claim 4, wherein detecting a cardiac anomaly using the cine image sequence and/or the fitted cardiac model comprises:
reconstructing a static three-dimensional cardiac image from at least a portion of the cine image sequence;
identifying the cardiac anomaly as a thickened right ventricle in the static three-dimensional cardiac image using a right ventricle wall thickness measuring algorithm; and
identifying the cardiac anomaly as a thickened left ventricle in the static three-dimensional cardiac image using a left ventricle wall thickness measuring algorithm; and
wherein the recommended imaging workflow is a quantitative flow analysis and/or a cardiac motion pattern analysis if the cardiac anomaly is a thickened right ventricle or a thickened left ventricle.

6. The medical system of claim 4, wherein detecting the cardiac anomaly using the cine image sequence and/or the fitted cardiac model comprises identifying the cardiac anomaly as abnormal heart wall motion by inputting the cine image sequence into an abnormal heart wall motion detection algorithm, wherein the recommended imaging workflow comprises a late gadolinium enhancement magnetic resonance imaging protocol to detect cardiac scar tissue.

7. The medical system of claim 6, wherein the recommended imaging workflow comprises a cardiac stress test and/or a magnetic resonance perfusion test if the abnormal heart wall motion is not detected.

8. The medical system of claim 4, wherein detecting a cardiac anomaly using the cine image sequence and/or the fitted cardiac model comprises identifying the cardiac anomaly as a potential myocarditis if a cardiac anomaly is not detected, wherein the recommended imaging workflow comprises a T2 weighted imaging protocol to identify cardiac inflammation and/or a late gadolinium enhancement magnetic resonance imaging protocol to identify diffuse fibrosis.

9. The medical system of claim 1, wherein the preliminary three-dimensional cardiac image is motion resolved, and wherein the deformable cardiac model is motion resolved, and wherein the fitted cardiac model is motion resolved.

10. The medical system of claim 9, wherein execution of the machine executable instructions further causes the computational system to:
determine a set of field deformations between different cardiac phases and/or respiratory phases of the fitted cardiac model; and
reconstruct a magnetic resonance image from the motion resolved k-space data according to a motion-compensating magnetic resonance imaging reconstruction that uses the set of field deformations between the different cardiac phases and/or respiratory phases to perform motion correction.

11. The medical system of claim 1, wherein at least one of the following applies:
wherein the at least a portion of the motion resolved k-space data is retrieved a single time during acquisition of the k-space data either after a predetermined acquisition duration or after a predetermined number of k-space data acquisitions; and
wherein the at least a portion of the motion resolved k-space data is retrieved repeatedly during acquisition of the k-space data, wherein the preliminary three-dimensional cardiac image is reconstructed in iterative steps from the motion resolved k-space data.

12. The medical system of claim 1, wherein at least one of the following apply:
the predetermined region of interest has a volume greater than 750 cubic centimeters;
the machine executable instructions are configured to disable adjustment of the predetermined region of interest; and
combinations thereof.

13. A computer program comprising machine executable instructions stored on a non-transitory computer readable medium for execution by a computational system controlling a magnetic resonance imaging system configured to acquire lines of k-space data from a thoracic region of a subject; wherein execution of the machine executable instructions causes the computational system to: repeatedly acquire the lines of k-space data by controlling the magnetic resonance imaging system with pulse sequence commands, wherein the pulse sequence commands are configured to repeatedly acquire lines of k-space data according to a three dimensional free running cardiac magnetic resonance imaging protocol, wherein the pulse sequence commands are configured to repeatedly acquire the lines of k-space data for a predetermined region of interest; repeatedly assemble motion resolved k-space data from the lines of k-space data using at least one cardiac phase and one respiratory phase of the subject as the k-space data is acquired; retrieve at least a portion of the motion resolved k-space data during acquisition of the k-space data; and construct a preliminary three-dimensional cardiac image using at least a portion of the motion resolved k-space data before acquisition of the lines of k-space data is finished; construct a fitted cardiac model by fitting a deformable cardiac model to the preliminary three-dimensional cardiac image, wherein fitting the deformable cardiac model to the preliminary three-dimensional cardiac image adjusts the location of the set of planes in the fitted cardiac model, wherein the set of planes comprises at least one cardiac viewing plane, wherein the memory further comprises a deformable cardiac model, wherein the deformable cardiac model is three-dimensional, wherein the deformable cardiac model memory further defines the set of planes; and provide the at least one cardiac viewing plane.

14. A method of operating a magnetic resonance imaging system, wherein the magnetic resonance imaging system is configured to acquire lines of k-space data from a thoracic region of a subject, wherein the method comprises: repeatedly acquiring the lines of k-space data by controlling the magnetic resonance imaging system with the pulse sequence commands, wherein the pulse sequence commands are configured to repeatedly acquire the lines of k-space data according to a three-dimensional free running cardiac magnetic resonance imaging protocol, wherein the pulse sequence commands are configured to repeatedly acquire the lines of k-space data for a predetermined region of interest; repeatedly assembling motion resolved k-space data from the lines of k-space data using at least one cardiac phase and one respiratory phase of the subject as the k-space data is acquired; retrieving at least a portion of the motion resolved k-space data during acquisition of the k-space data; constructing a preliminary three-dimensional cardiac image using at least a portion of the motion resolved k-space data before acquisition of the lines of k-space data is finished; constructing a fitted cardiac model by fitting a deformable cardiac model to the preliminary three-dimensional cardiac image, wherein fitting the deformable cardiac model to the preliminary three-dimensional cardiac image adjusts the location of the set of planes in the fitted cardiac model, wherein the set of planes comprises at least one cardiac viewing plane, wherein the deformable cardiac model is three-dimensional, wherein the deformable cardiac model memory further defines a set of planes; and providing the at least one cardiac viewing plane.

15. The method of claim 14, wherein the method further comprises placing the thoracic region of the subject within the predetermined region of interest.

* * * * *